United States Patent
Cox et al.

(10) Patent No.: US 9,381,520 B2
(45) Date of Patent: Jul. 5, 2016

(54) APPARATUS AND METHOD FOR MAGNETICALLY TREATING FLUIDS

(71) Applicant: SPINFLIP LLC, Brooklyn, NY (US)

(72) Inventors: Robert Eastwood Cox, Huntington, NY (US); Oliver Hamilton Bodine, Huntington, NY (US); William Brinton Cox, Halifax (CA)

(73) Assignee: SpinFlip LLC, Huntington, NY (US)

( * ) Notice: Subject to any disclaimer, the term of this patent is extended or adjusted under 35 U.S.C. 154(b) by 0 days.

(21) Appl. No.: 15/005,733

(22) Filed: Jan. 25, 2016

(65) Prior Publication Data

US 2016/0137938 A1    May 19, 2016

Related U.S. Application Data

(63) Continuation-in-part of application No. 14/180,360, filed on Feb. 14, 2014, now abandoned.

(60) Provisional application No. 61/791,940, filed on Mar. 15, 2013.

(51) Int. Cl.
| | |
|---|---|
| *F02M 27/04* | (2006.01) |
| *B03C 1/28* | (2006.01) |
| *C02F 1/48* | (2006.01) |
| *B03C 1/02* | (2006.01) |

(52) U.S. Cl.
CPC . *B03C 1/288* (2013.01); *B03C 1/02* (2013.01); *C02F 1/482* (2013.01); *F02M 27/045* (2013.01); *B03C 2201/30* (2013.01); *C10L 2290/40* (2013.01)

(58) Field of Classification Search
CPC .......... B03C 1/02; B03C 1/0332; B03C 1/28; B03C 1/288; B03C 1/22; B03C 1/30; C02F 1/005; C02F 1/48; C02F 1/481; C02F 1/482; C10L 2290/40; F02M 27/045
See application file for complete search history.

(56) References Cited

U.S. PATENT DOCUMENTS

| | | | |
|---|---|---|---|
| 2,652,925 A | 9/1953 | Vermeiren | |
| 3,228,868 A | 1/1966 | Ruskin | |
| 4,188,296 A | * 2/1980 | Fujita | F02B 51/04 |
| | | | 210/222 |
| 4,265,754 A | 5/1981 | Menold | |
| 4,265,755 A | 5/1981 | Zimmerman | |

(Continued)

FOREIGN PATENT DOCUMENTS

EP    1587761 B1    10/2006

OTHER PUBLICATIONS

Klaus J. Kronenberg, Experimental Evidence for the Effects of Magnetic Fields on Moving Water, IEEE Conference transactions: IEEE Transactions on Magnetics, Sep. 1985, pp. 2059-2061, St. Paul, Minnesota, United States.

(Continued)

*Primary Examiner* — David C Mellon
(74) *Attorney, Agent, or Firm* — Robert M Cox, Esq

(57) ABSTRACT

An apparatus and methodology is presented for magnetically conditioning any hydrocarbon based fluid flowing through a conduit or pipe. The object of the invention is to advance the art by increasing the range of application, the effectiveness, the simplicity and the ease of use of a magnetic fluid conditioning device. The invention accomplishes this by a unique magnetic and mechanical configuration, not taught in the art or previously known to the applicants.

17 Claims, 12 Drawing Sheets

(56) References Cited

U.S. PATENT DOCUMENTS

| | | | |
|---|---|---|---|
| 4,605,498 A | 8/1986 | Kulish | |
| 5,055,189 A | 10/1991 | Ito | |
| 5,056,872 A | 10/1991 | Hempelmann | |
| 5,269,916 A | 12/1993 | Clair | |
| 5,366,623 A | 11/1994 | Clair | |
| 5,378,362 A | 1/1995 | Schoepe | |
| 5,502,425 A * | 3/1996 | Tsai | H01F 7/0278 210/222 |
| 5,558,765 A | 9/1996 | Twardzik | |
| 6,007,715 A * | 12/1999 | Liu | A61N 2/06 123/536 |
| 6,068,768 A | 5/2000 | Carpenter | |
| 6,171,504 B1 | 1/2001 | Patterson | |
| 7,137,621 B1 | 11/2006 | Bagley | |
| 7,445,694 B1 | 11/2008 | Riera | |
| 2003/0150816 A1 | 8/2003 | Sacs | |
| 2012/0228205 A1 | 9/2012 | Tao | |

OTHER PUBLICATIONS

Ron Kita, Is there a Credible Basis for Magnetic Devices to Represent Green Technology?, Infinite Energy, Jan./Feb. 2009, Issue 83, Concord, New Hampshire, United States. 3 pages.

* cited by examiner

APPARATUS AND METHOD FOR MAGNETICALLY TREATING FLUIDS

CROSS REFERENCE TO RELATED APPLICATIONS

The present application claims the benefit as a continuation-in-part of U.S. Nonprovisional application Ser. No. 14/180,360 filed Feb. 14, 2014 titled "Apparatus and Method for Magnetically Treating Fluids" with Robert E Cox, Oliver H Bodine and William B Cox as joint inventors, which is incorporated herein by reference. The U.S. Nonprovisional application Ser. No. 14/180,360 itself claims the benefit of U.S. Provisional Application 61/791,940 filed Mar. 15, 2013.

FIELD OF THE INVENTION

The field of the present invention generally relates to magnetically conditioning fluids and gases.

BACKGROUND OF THE INVENTION

Magnetic water conditioning devices have been used as early as the 1950s (Vermeiren U.S. Pat. No. 2,652,925) for conditioning water in an effort to prevent scale build up and minimize the damaging effects of hard water on pipes. Municipal water supplies and other commonly available water sources often contain a variety of mineral components including, calcium carbonate and other mineral compounds which can precipitate out of solution and aggregate to form scales on pipe walls thereby restricting flow and causing corrosive damage. Mineral aggregation on a pipe wall can provide a matrix for the accumulation of algae and other organisms which can further damage pipes due to biologic corrosion. The molecular chemistry of these processes is often complex and not always well understood as myriad variables, such as water borne chemicals and biologic constituents, may vary considerably depending on location and the specific application.

However, it is generally recognized that when an aqueous media, such as municipal water, passes through a magnetic field electric currents and charges are induced that affect free ions in the water (Patterson U.S. Pat. No. 6,171,504). Placing a negative electric charge on the conduit or pipe (Clair U.S. Pat. No. 5,366,623) repels particulates and ions suspended in the water which also tend to be negatively charged—referred to as "pipe charging" (1-15). This process prevents mineral aggregation on the conduit walls via a number of electrochemical mechanisms including encouraging the formation of microscopic crystallization nuclei leading to the seeding of minerals which are then unavailable for aggregation on vessel walls (Kronenberg, *Experimental Evidence for the Effects of Magnetic Fields on Moving Water*) and (Schoepe U.S. Pat. No. 5,378,362 5-25). Early approaches to magnetic water conditioning did find limited success, but have since given way to more studied approaches and sophisticated devices that have gained wider acceptance not only for domestic water conditioning, but for numerous industrial applications, such as the prevention of mineral incrustation of large boilers. More recently, applications for magnetic fluid conditioning devices have extended to gasses and other liquids, such as hydrocarbon oils and fuels. For example, magnetic conditioners are now employed widely in the oil industry as a lower cost alternative to harsh and toxic chemicals used to mitigate paraffin buildup in oil pumps and oil pipes and managing the corrosion by-product of heavily mineralized water that is often present in oil production (Guo et al).

Magnetic conditioning devices are also used for treating fuel oil for heating plants and are marketed for treating gasoline and diesel fuel for which application they are reported to increase fuel efficiency and reduce the exhaust emissions in internal combustion engines and other hydrocarbon burning devices. The magnetic treatment devices are positioned either internal to a fuel conduit or externally mounted on a fuel conduit. A wide variety of designs have been employed to treat liquid hydrocarbon fuels that purport to ionize, de-clump, or unfold hydrocarbon chains and reduce fuel viscosity thereby affording a greater surface fuel area and greater number of molecular oxidation sites improving combustion efficiency and lowering particulate emissions and noxious gas emissions (Fujita U.S. Pat. No. 4,188,296). Sacs (EP1587761 A1) and Twardzic (U.S. Pat. No. 5,558,765) teach the mechanism of "spinflip" in which valence electrons in atoms as part of larger molecular structures, will absorb a precise amount of electromagnetic energy and realign (flip) in the direction of an imposed magnetic field and will seek equilibrium by assuming a new configuration within the molecule. This is held to produce an unclumping of hydrocarbon molecules and an unfolding and separation of the hydrocarbon molecular chains. Tao (US 2012/0228205) reported a direct correlation between the magnetic treatment of hydrocarbon fuel and a reduction in fuel viscosity. Guo et al also noted a decrease in viscosity and also a reduction in hydrocarbon surface tension after the application of a magnetic field. Similarly, Fujita (U.S. Pat. No. 4,188,296) states that hydrocarbons passing through magnetic flux reorient and shift their structure, considerably weakening or depressing van der Waal forces, helping to disperse hydrocarbon molecules. Van der Waal forces are the net attractive and repulsive intermolecular forces. Fujita further demonstrates fuel treatment optimization for his device by showing magnetic flux strength versus post combustion particulate emissions and mono-nitrogen oxides (NOx) content of the exhaust gas. It is interesting to note that Fujita's data shows Gaussian strength sweet spots for fuel treatment optimization in the range of from 1600 to 2300 Gauss for his device. This strongly suggests that there are preferential magnetic strength "windows" that supply the "right" level of magnetic energy stimulus necessary to alter the hydrocarbon molecule configuration for a given fuel and fuel transport parameter. According to R. Kita reporting in Infinite Energy Issue 83 January/February 2009, in referring to Fujita's data in the magnetic treatment of hydrocarbon fuels (U.S. Pat. No. 4,188,296); "What is not understood by many is that the effect is non-linear, which means that too high a magnetic field results in a diminished effect . . . it seems like the series of waves relate that a quantum effect is occurring. Many times in science proportionality is assumed, and in this case the effect is non-linear and discrete levels of gauss must be used to achieve positive results."

It is evident from the foregoing discussion that there is a multiplicity of electric and magnetic mechanisms at work in treating different fluids with a magnetic field, requiring the application of the appropriate level of magnetic stimulus. In more electrically conductive fluids, particularly aqueous fluids, electric currents induced by magnetic fields play a larger roll in modifying the fluid transporting environment and in ionizing various particles, minerals and promoting the seeding of mineral crystals. Whereas in fuels, such as hydrocarbons, different changes occur on an atomic and molecular level. The magnetic treatment of these fluids is optimized with the application of an appropriate level of quantum stimulus energy i.e., magnetic field intensity and magnetic vector.

Clair (U.S. Pat. No. 5,269,916) teaches that an optimal water conditioning effect is achieved when fluid passes through a magnetic field that is orthogonal to the flow of said fluid which comports with Faraday's Law. The resulting induced electrical current imposes a negative charge on a pipe wall which repels mineral ions and other particles that also tend to be negatively charged. In the water conditioning industry this is referred to as "pipe charging". In U.S. Pat. No. 5,366,623 Clair employs a plurality of 12,000 Gauss neodymium iron boron permanent magnets and flux concentrator pieces arranged circumferentially about a fluid conduit. The magnetic poles alternate so that a N pole is always adjacent to a S pole ensuring that the magnetic flux passes through the fluid conduit or pipe entirely orthogonal (2-5) to the fluid flow in order to impart the maximum electric charge to a conduit or pipe to prevent corrosion, scaling, algae or other forms of aggregation on a pipe wall. The apparatus produces a magnetic field that is exclusively orthogonal to treated fluid. It is a complex assembly comprising many parts and adding significant bulk to the fluid conduit.

Prior art in Riera (U.S. Pat. No. 7,445,694) shows that when treating hydrocarbon fuels, it is useful to subject the fluid flow to multiple, dynamic magnetic field vectors to induce stereochemical molecular deformation. This results in shifting a hydrocarbon fuel's outer valence electrons to a higher energy state, thereby imposing polarizing electric and magnetic forces on the molecule's structure which tends to unfold and straighten out the hydrocarbon molecule chains exposing many more oxidation sites for increased combustion efficiency. Riera uses a complex arrangement of electromagnets and permanent magnets and driver electronics, which subjects the fuel to a plethora of magnetic field vectors varying in strength, direction and frequency in order to provide stimulus energies for inducing molecular deformation The Riera apparatus is complex requiring expensive electronic driver circuitry and electronic frequency source for the electromagnets which may prohibit its use for most simpler applications such as fuel conditioning for a passenger car or conditioning a domestic water supply.

Still another approach to magnetically treat fluid such as hydrocarbon fuels and water is shown by Glass (U.S. Pat. No. 6,056,872). It employs like pole, juxtaposing permanent magnets i.e., S-S or N-N, arranged axially along a fluid conduit which the inventor claims to produce predominantly orthogonal lines of magnetic flux lines that pass through the fluid conduit. However, in Figures of the '872 patent magnetic flux lines bend away from the juxtaposed like, S pole magnet faces at curved angles (2-45) and do not to appear to be orthogonal. A major deficiency in employing juxtaposed, like pole magnets in this manner is that it produces areas devoid of magnetic flux by mutual repulsion wherein fluid in these areas remains untreated. In an attempt to remedy this problem, (3-25) juxtaposed S only magnet poles each facing into the fluid conduit which are varied in combination of magnet strength and or size and or magnet to magnet spacing in an attempt to offset the spatial position of the flux void produced by each magnet grouping. This would seemingly eliminate a contiguous flux void that would otherwise run the length of the fuel treatment apparatus and allow a significant percentage of the fuel to exit untreated. Glass, in offsetting the flux void areas away from the axis of fuel flow, potentially leaves a significant portion of the fluid treatment area devoid of magnetic flux or flux that is not orthogonal to the flow of fluid as asserted in the patent.

Schoepe (U.S. Pat. No. 5,378,362) offers another approach to the magnetic treatment of fluids wherein two groups of opposite pole, juxtaposed magnet pairs are placed axially on the periphery of the fluid conduit. Each magnet pair within a group is separated by paramagnetic spacers of equal thickness. The spacing between the magnets within the first group has a dimensional relationship with the spacing between the magnets of the second group so that the magnet spacing in the second group exceeds the magnet spacing in the first group by at least 5% of a whole number multiple of the first group. Schoepe refers to this as non-harmonic spacing and asserts that the magnet spacing promotes a stimulating resonant effect acting on the oscillatory nature fluid particles in water. However, any resonant stimulating effect is also dependent on the velocity of the fluid through the conduit and this device only proposes two resonant points which leaves open the possibility of resonances outside the range of the two magnet groups.

Fujita (U.S. Pat. No. 4,188,296) presents a magnetic device for treating fluid fuel in which a plurality of juxtaposed N and S magnet poles are mounted in a magnetically permeable yoke surrounding a fuel conduit. The magnet faces adjacent and orthogonal to the fuel conduit are adjustable to alter the strength of the magnetic flux passing through the fuel, hence giving ability to optimize the efficiency of the fuel treatment. Fujita demonstrated optimal adjustment points, between the maximum and minimum magnetic flux strength.

SUMMARY OF THE INVENTION

In the present invention, the apparatus is comprised of two housings, each having a plurality of juxtaposed permanent magnets, that are easily slid over a conduit or pipe. The magnets are positioned in a non-linear progressive pattern which subjects the fluid or gas being transported to a broad spectrum of magnetic flux in terms of flux intensity, flux direction and flux induced oscillations which enhances the combustion properties of a fuel and minimizes the aggregation of organic and mineral solids in aqueous fluids or hydrocarbon fluids on the transporting vessel walls.

The prior art has shown various apparatus and methods for treating fluids and gasses. It is well established that the principal method to magnetically treat aqueous fluids is to impart a large negative electric charge to pipe walls thereby repelling and suspending in solution negatively charged mineral ions and particles that may otherwise aggregate and clog a pipe or conduit. Apparatus in the prior art generally employ magnetic fields which they attempt to pass, exclusively or mostly, orthogonally through the moving aqueous fluid to achieve a maximum induced electric current and the maximum negative charge on the pipe wall. However, when treating a broader range of fluids from highly conductive aqueous fluids, to more dielectric fluids and viscous hydrocarbon fuels and oils, it is posited that imposing a magnetic field exclusively orthogonal to the axis of fluid flow does not adequately access or stimulate hydrocarbon molecules that are randomly oriented, folded and clumped and bound by van der Waal forces. Bear in mind that, collectively, atomic electrons, particularly hydrogen electrons, within a hydrocarbon's molecular structure have a magnetic moment which is more or less randomly oriented. To produce a maximum response or "spinflip" and align the valence electrons to an externally imposed magnetic field, it must be stimulated by the "right" magnetic vector gradient. For example, Hydrogen atoms within the hydrocarbon molecules which are spinflipped convert from a parahydrogen state to an orthohydrogen state which reacts much more efficiently during combustion (Ruskin U.S. Pat. No. 3,228,868).

The inventors contend that the precise strength of the magnetic field is only one component of the "right" stimulative energy, the other factor being the vector angle of the magnetic field with respect to an electrons magnetic moment. One might think of clumped hydrocarbon molecules as analogous to a tangled bunch of sticky string which must be untangled to expose more surface area for efficient combustion. Shaking the string in different directions at different amplitudes and at different rates would help to loosen and untangle the string so that it could be shaken out straight.

The invention employs a similar concept by subjecting a flowing hydrocarbon fluid to a magnetic field spectrum which varies in strength, flux direction and periodicity of the magnetic impulse, induced by the rate at which fluid flows through the magnetic field. The variability of these factors in one embodiment of the invention is produced by a non-harmonic spacing of juxtaposed magnets arranged in a progressive, nonlinear pattern. One such pattern is derived from the well known Fibonacci sequence. Magnet pairs arranged in such a manner are mounted peripherally on a fluid conduit which provides a gauntlet of magnetic fields through which the fluid must pass. The invention imposes the magnetic field through the flowing fluid which reverses in polarity at progressively increasing or decreasing rates (depending on the distance between adjacent magnets), and varies magnetic flux strength due to reinforcement and interference of the magnetic fields between adjacent and juxtaposed magnet poles.

The aperiodic imposition of magnetic pulses on a fluid also stimulates destructive resonant forces on particles and agglomerated impurities contained within a fluid which has been shown to be effective in water treatment (Schoepe U.S. Pat. No. 5,378,362 4-10). In one embodiment of the present invention, the Unit is positioned on the conduit so that the flow enters the Unit where the magnets are proximally spaced and exits the Unit where the magnets are more distally spaced. At the fluid entry point this configuration provides more diverse magnetic flux vectors and range of flux intensities to more fully match the spinflip energy "window" within a hydrocarbon molecular structure. The mid-section magnets provide decreasing periodicity of pole reversals and the last, more isolated magnet stage presents a stronger, mostly orthogonal magnetic field to the exiting fluid which completes the straightening and alignment of hydrocarbon molecules and induces greater electric current in aqueous fluids.

The present invention produces a spectrum of magnetic field intensities, magnetic vectors and induced frequencies which expose treated fluids to a gauntlet of magnetic forces allowing the appropriate quantum excitation energy and frequency to effect the most efficient fluid treatment process for any particular application. These quantifiably achieved efficiencies have caused a remarkable improvement in fuel reactivity leading to better fuel economy, enhanced performance and significant reduction in noxious emissions.

BRIEF DESCRIPTION OF THE DRAWINGS

Preferred and alternative examples of the present invention are described in detail below with reference to the following Figure drawings.

DETAILED DESCRIPTION

Figure 1:
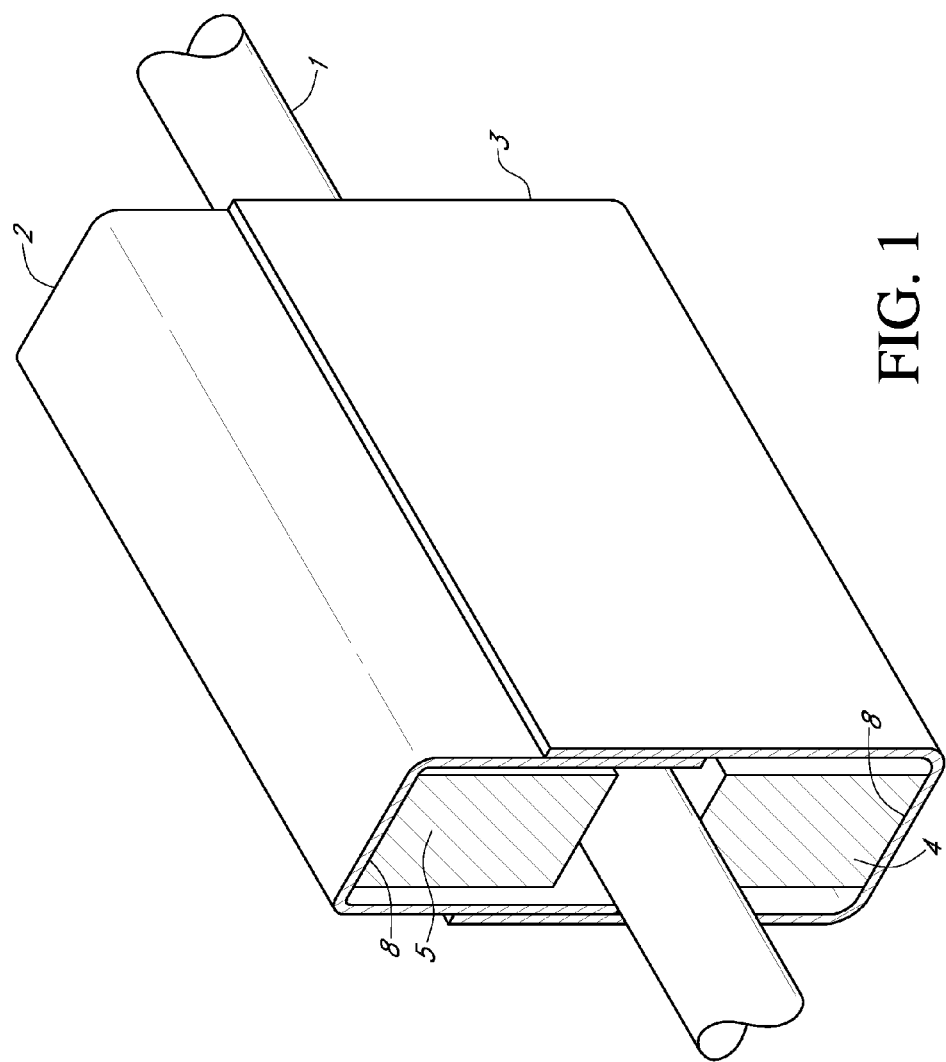
FIG. 1 is a perspective rendering that shows the fluid conditioning unit installed on a fluid carrying pipe.
Figure 2:
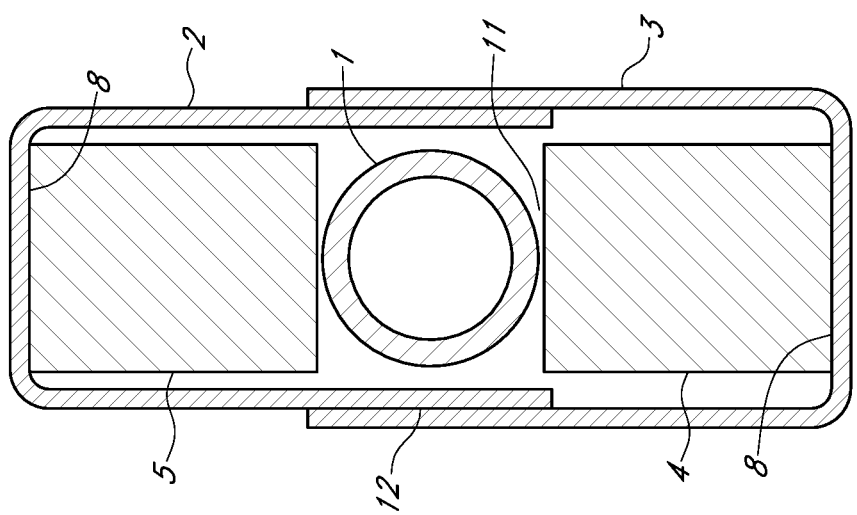
FIG. 2 is an end view of a fluid conditioning Unit installed on a pipe.

The invention apparatus shown in FIG. 1 is a magnetic conditioning device which is peripherally attached to a conduit or pipe FIG. 2 1 through which any gas or fluids may flow. In a particular embodiment, the conduit carries fuels such as gas or diesel in an engine or heating system. The invention comprises two U shape channels, forming Unit half 2 and Unit half 3, that are made of a material, such as metal (and in a particular embodiment, cold rolled steel) sufficient to provide a circuit and magnetically shield the Unit, minimizing the potential for stray fields to interfere with nearby magnetically sensitive devices (in particular computers and sensors in an automobile engine compartment or combustion heating device). The widths of unit half 2 and unit half 3 are slightly different so that the smaller part 2 will slide fit 13 into the larger part 3 with a minimal air gap between the intersecting walls 12 forming a contiguous magnetic shield and a complete magnetic circuit. By nature of the sliding fit, the engagement of Unit halves 2,3 are adjustable, easily permitting the capture of a wide range of conduit sizes 6 while maintaining contact 11 between the magnet faces and the fluid conduit ensuring no loss in magnetic flux density in the fluid or gas. Unit halves 2 and 3 are shown prior to installation over a conduit in FIG. 3. The Unit halves, when mated about a conduit, are held together by magnetic attraction; however, additional securing devices such as zip ties, duct tape or other fasteners may also be used for additional security (not shown in the Figures).

A plurality of permanent magnets 4, 5 are affixed on the bottom of each unit half 8 using glue or epoxy or by other suitable attachment means. In an embodiment of the invention five magnets are located in each Unit half FIG. 4 4, 14, FIG. 5 5, 15 and FIG. 6 4,14. However, in other embodiments of the invention any number of magnets may be employed. The magnet material may be either a rare earth type, NIB (neodymium-iron-boron) or ceramic (ferrite) depending on the characteristics of the fluid or gas being transported and the operating environment i.e., the ambient temperature must be well below the Curie temperature (demagnetizing temperature) of the magnets. Each magnet expresses a single magnetic pole facing the exterior surface of the fluid conduit 1 and a single magnetic pole on its opposite face which is facing the inside bottom of each unit half 8. In one embodiment all the magnets in a given Unit are identical in strength and can range from 500 to 13,000 Gauss. It is not intended to limit applying magnets of unequal strengths in other configurations. The appropriate magnet strength is based on the fluid or gas and conduit characteristics and is determined by empirical testing by one practiced in the art. In one embodiment the magnet shape is rectangular however, the magnet shape may also be rectilinear, cylindrical or any other suitable geometric shape. In a further embodiment, the Unit is positioned on the conduit so that the flow enters the Unit where the magnets are proximally spaced and exits the Unit where the magnets are more distally spaced.

Figure 3:
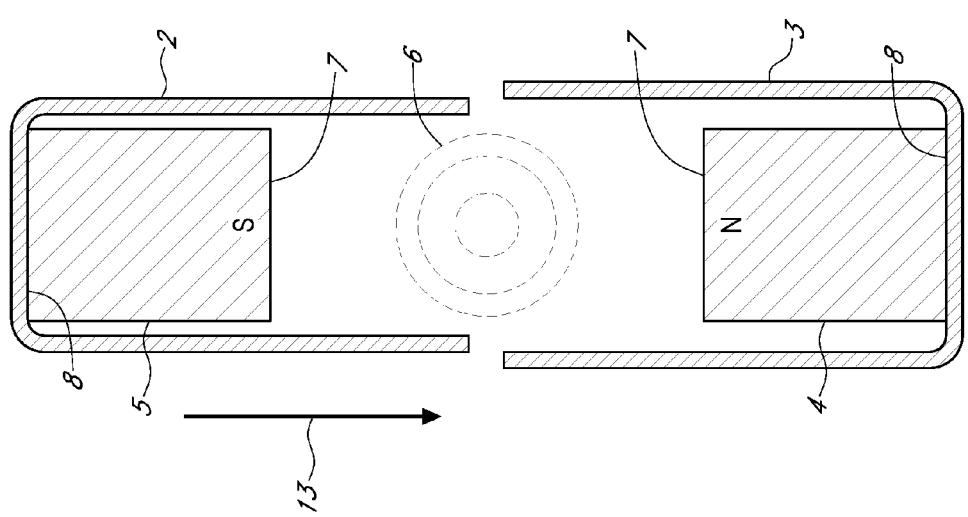
FIG. 3 is an end view of a fluid conditioning Unit prior to mating over a pipe.
Figure 4:
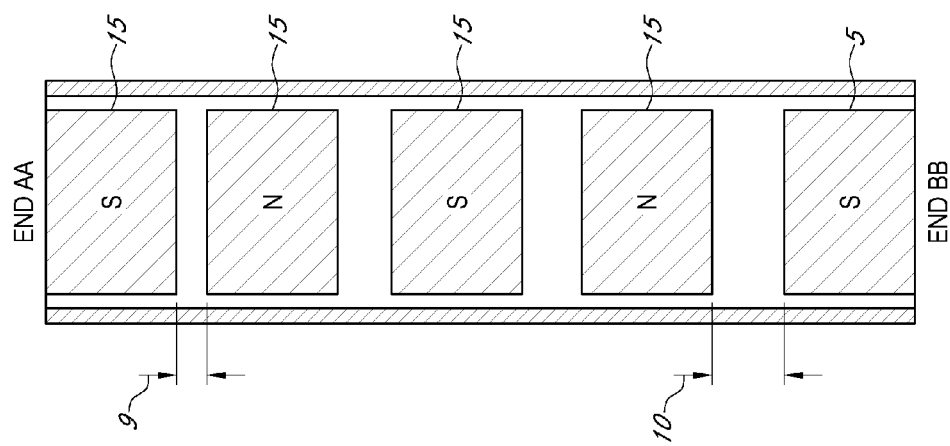
FIG. 4 is a view looking into a fluid conditioning Unit half 3 from the top of the "U" channel.
Figure 9:
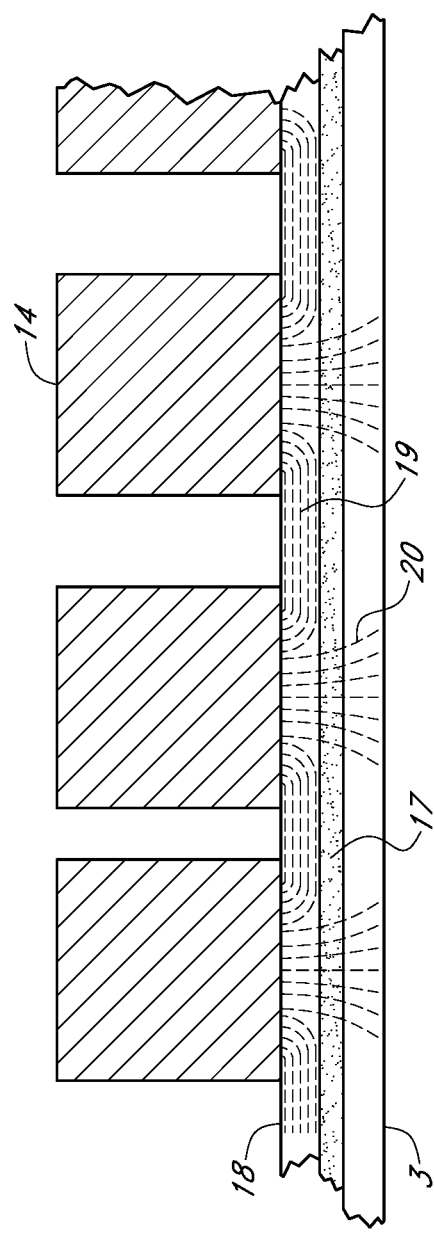
FIG. 9 is a side cross-section view of a fluid conditioning Unit featuring a flux diverter plate and a non-magnetic spacer, as in FIG. 8.

In a further embodiment of the invention the magnet spacing pattern FIG. 4 9, 10, is identical for both channels, such that when the Unit halves 2, 3, are mated about a fluid conduit 1 each magnet in 2 is juxtaposed and aligned to face a magnet in 3, and the polarity of the facing surface of each magnet in 2 corresponds to an opposite magnet polarity of the facing surface of each magnet in 3. In FIG. 3 magnet 4 presents an N pole and magnet 5 presents a S pole on the surfaces adjacent to the conduit 1. One preferred mating orientation is shown using juxtaposed magnet faces of opposing polarity when mating FIG. 4 End A with FIG. 5 End AA.

Also in a further embodiment of the invention the spacing between the magnets 9, 10 can be a progressive non-linear sequence which is determined by the Fibonacci Sequence or the closely related Golden Ratio (1:1.61803). In yet another embodiment of the invention spacing between magnets may also be linear. In this case the incremental spacing of the magnets is adjusted to obtain a desired magnetic pattern and frequency of the induced effect on the fluid or gas which is adjusted according to the intended flow rate and/or empirical observation of efficacy.

Figure 5:
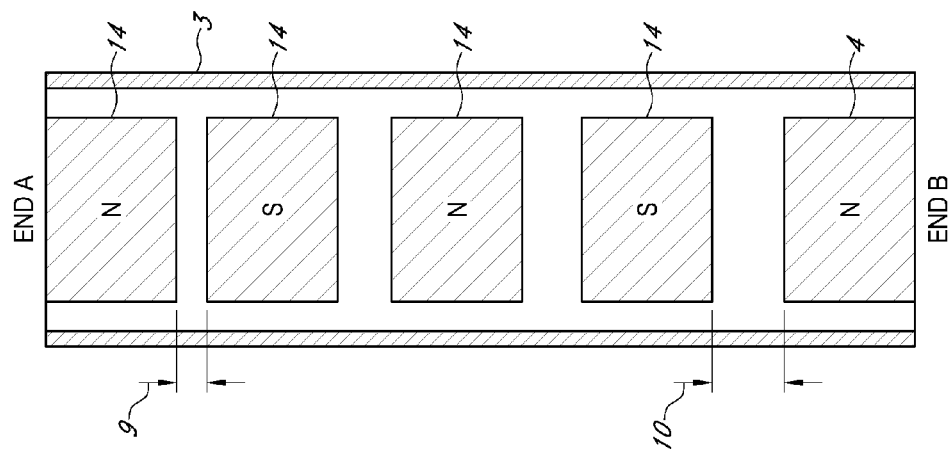
FIG. 5 is a view looking into a fluid conditioning Unit half 2 from the top of the "U" channel.
Figure 6:
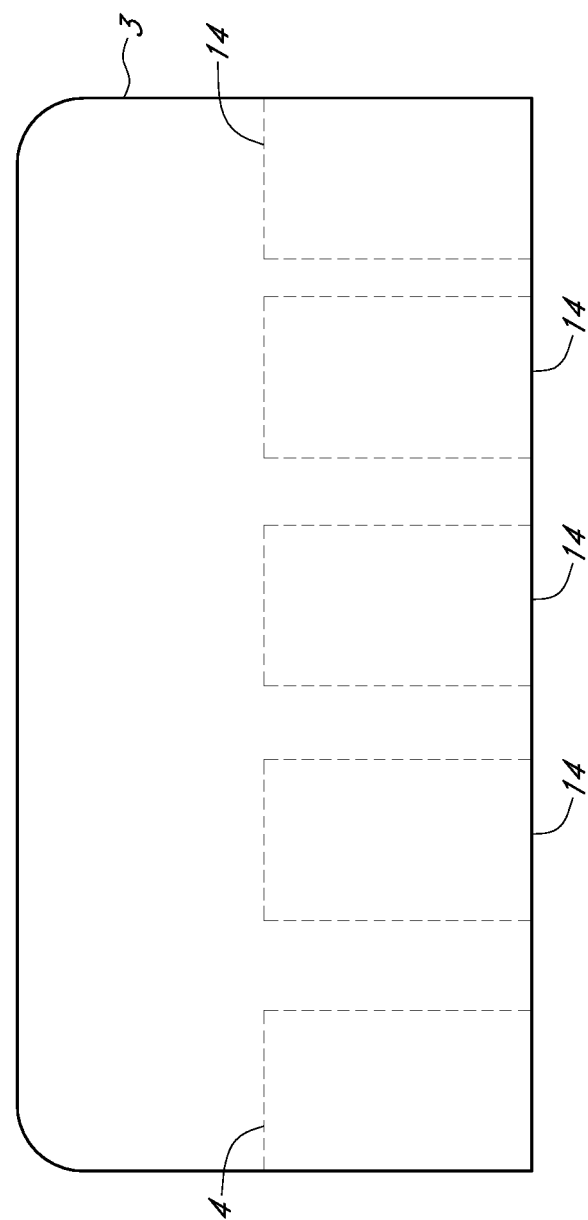
FIG. 6 is a side view of the wider Unit half 3 showing one example of magnet positions and spacing.

In another embodiment of the invention, unit halves 2 and 3 may be engaged in reverse, that is to say, when 2 and 3 are mated in this configuration, FIG. 5 End BB would then be aligned with FIG. 4 End A. causing the juxtaposed magnets in 2 and 3 to be slightly offset axially thereby creating a different magnetic flux pattern which is useful for some applications.

Figure 7:
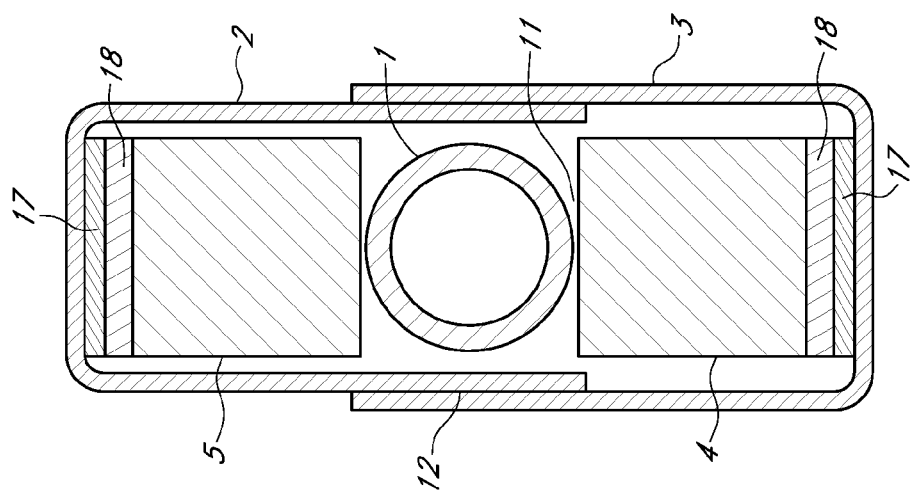
FIG. 7 is an end view of a fluid conditioning Unit featuring a flux diverter plate and a non-magnetic spacer.
Figure 8:
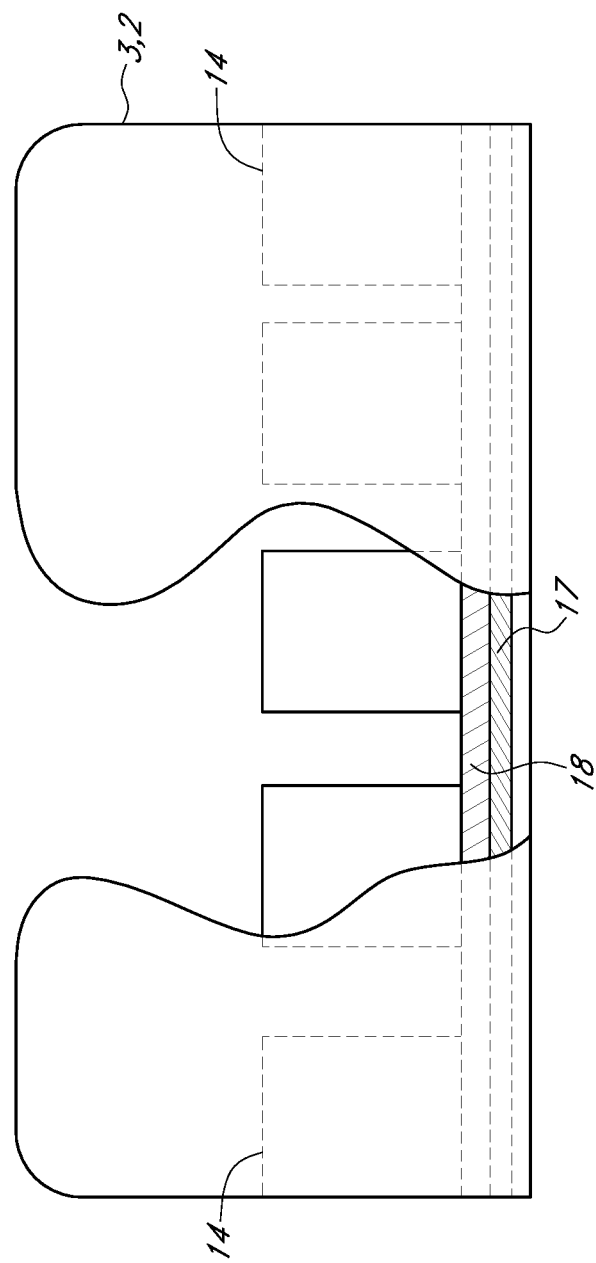
FIG. 8 is a side view of a fluid conditioning Unit featuring a flux diverter plate and a non-magnetic spacer, as in FIG. 7.

In an additional embodiment shown in FIG. 7, FIG. 8, and FIG. 9, the magnets in each channel half 2, 3 are mounted on a magnetically permeable flat bar (flux diverter plate) 18 with an assigned separation between magnets 9, 10. Additionally, a non-magnetic spacer 17 made of plastic, silver, copper, gold, aluminum or zinc (typically 0.032 to 0.250 inches thick, preferably 0.0625 inches thick) is positioned between the outer channel and the flux diverter plate which increases the reluctance of the magnetic circuit to pass through the outer channel. In a preferred embodiment, the spacer is made of copper. The magnetic saturation level of the diverter plate is directly related to plate thickness and to the magnetic properties of the plate material. For example, with a very thick plate, magnetic saturation will not occur, and all of the flux will be contained within the plate thereby directed to adjacent magnets which are of opposite polarity, whereas with a thin plate, magnetic saturation will occur at a much lower flux level allowing some of the flux to pass directly through the flux diverter plate 18 and the non-magnetic spacer 17 to the outer channel 2, 3 where it is conducted to the mating channel half. Therefore by selecting the proper flux diverter plate thickness and the non-magnetic spacer thickness, one may control the proportion of flux 19 directed to adjacent magnets, the inner magnetic circuit, and the flux 20 which passes through the flux diverter plate to the outer channel completing the outer magnetic circuit. The magnetic field directed by the flux diverter plate alters the proportion of flux which is predominantly orthogonal and the flux which is more axial to the flow in the fluid conduit 1 permitting the further variation and optimization of the flux patterns within the fluid conduit space. In addition, by redirecting a portion of flux away from the outer channel the amount of stray magnetic field outside of the unit is significantly reduced.

Figure 12:
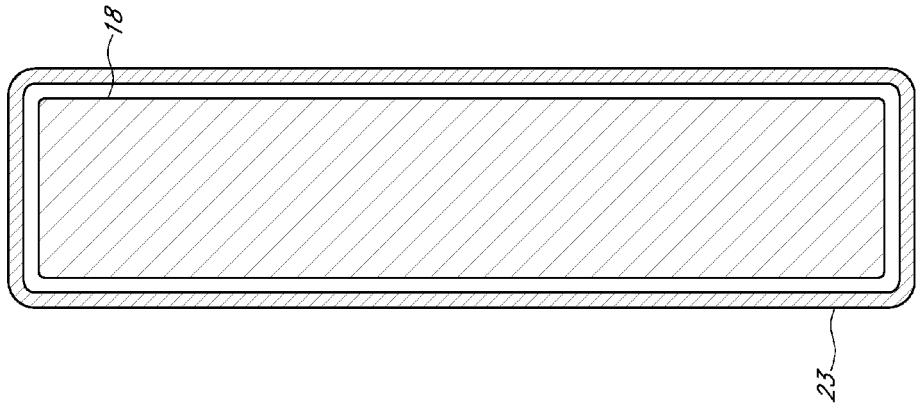
FIG. 12 is a cross-section of the bottom of a two-piece spacer-enclosure (Magnet Module cap) featuring an enclosed flux diverter plate.
Figure 11:
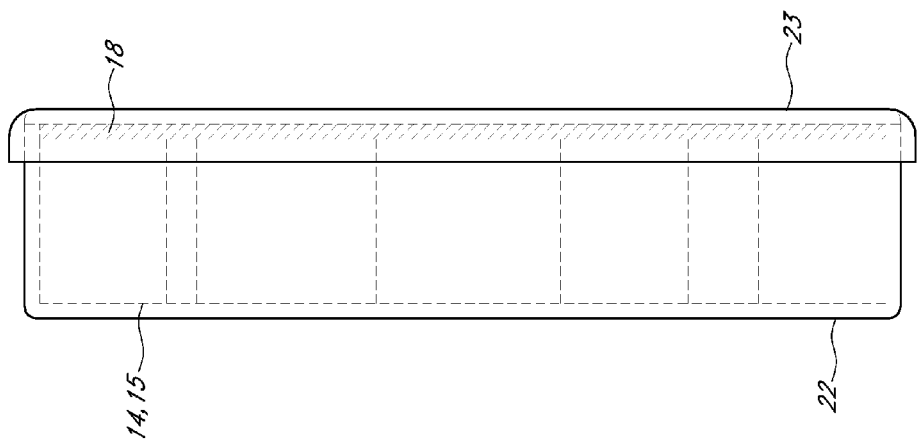
FIG. 11 is a side view of an assembled a two-piece spacer-enclosure featuring enclosed magnets and an enclosed flux diverter plate, as in FIG. 10 and FIG. 12.
Figure 10:
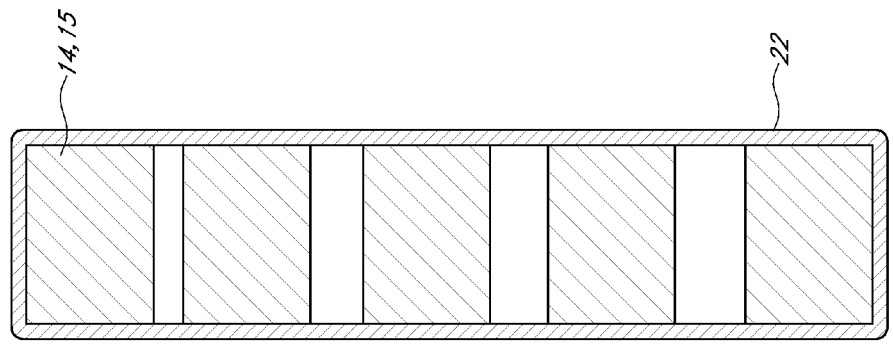
FIG. 10 is a cross-section of the top of a two-piece spacer-enclosure (Magnet Module main enclosure) featuring enclosed magnets.

In an additional embodiment shown in FIG. 10, FIG. 11, and FIG. 12, the non-magnetic spacer (shown as a flat bar 17 in FIG. 9) forms an enclosure of one or more pieces 22, 23 (a spacer-enclosure) surrounding the magnets 14, 15. The enclosure may further enclose the flux diverter plate 18. This configuration provides the additional advantage of sealing the magnets and optional flux diverter bar to protect them from contaminants or corrosion introduced in the operating environment (for example, an automobile engine compartment). The foregoing Magnet Module Assembly (spacer-enclosure) can be formed of one or more pieces of molded or cast material (such as plastic, aluminum or zinc). Alternatively, the Magnet Module Assembly (spacer-enclosure) may be fabricated from one or more pieces of pliable material (such as silver, copper, gold, aluminum or zinc). The Magnet Module Assembly may be made from plastic, silver, copper, gold, aluminum or zinc (typically 0.032 to 0.250 inches thick, preferably 0.0625 inches). The Magnet Module Assembly (spacer-enclosure) shown in FIG. 11 is fabricated from copper and comprises a Magnet Module main enclosure FIG. 10 22 and a Magnet Module cap FIG. 12 23. The wall thickness of the Magnet Module main enclosure 22 and Magnet Module cap 23 functions as a non-magnetic spacer.

Figure 13:
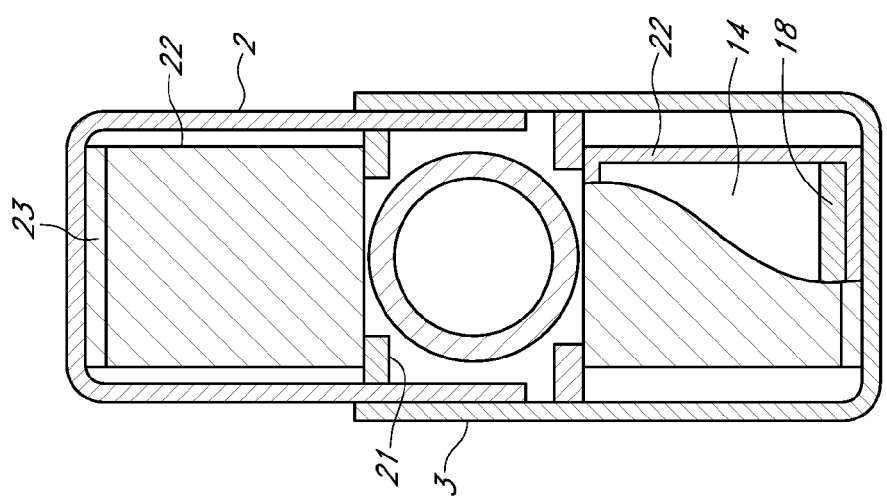
FIG. 13 is an end view of a fluid conditioning Unit featuring two-piece spacer-enclosures (Magnet Module Assemblies) and parallel Retaining Bars.
Figure 14:
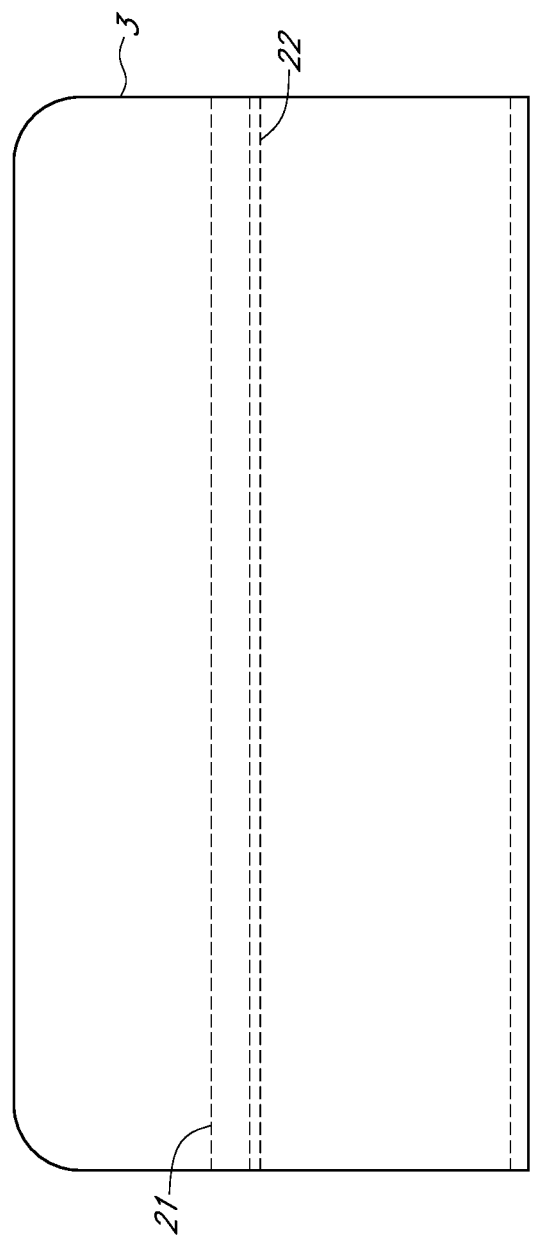
FIG. 14 is a side view of a fluid conditioning Unit half featuring a spacer-enclosure and parallel Retaining Bars.
Figure 15:
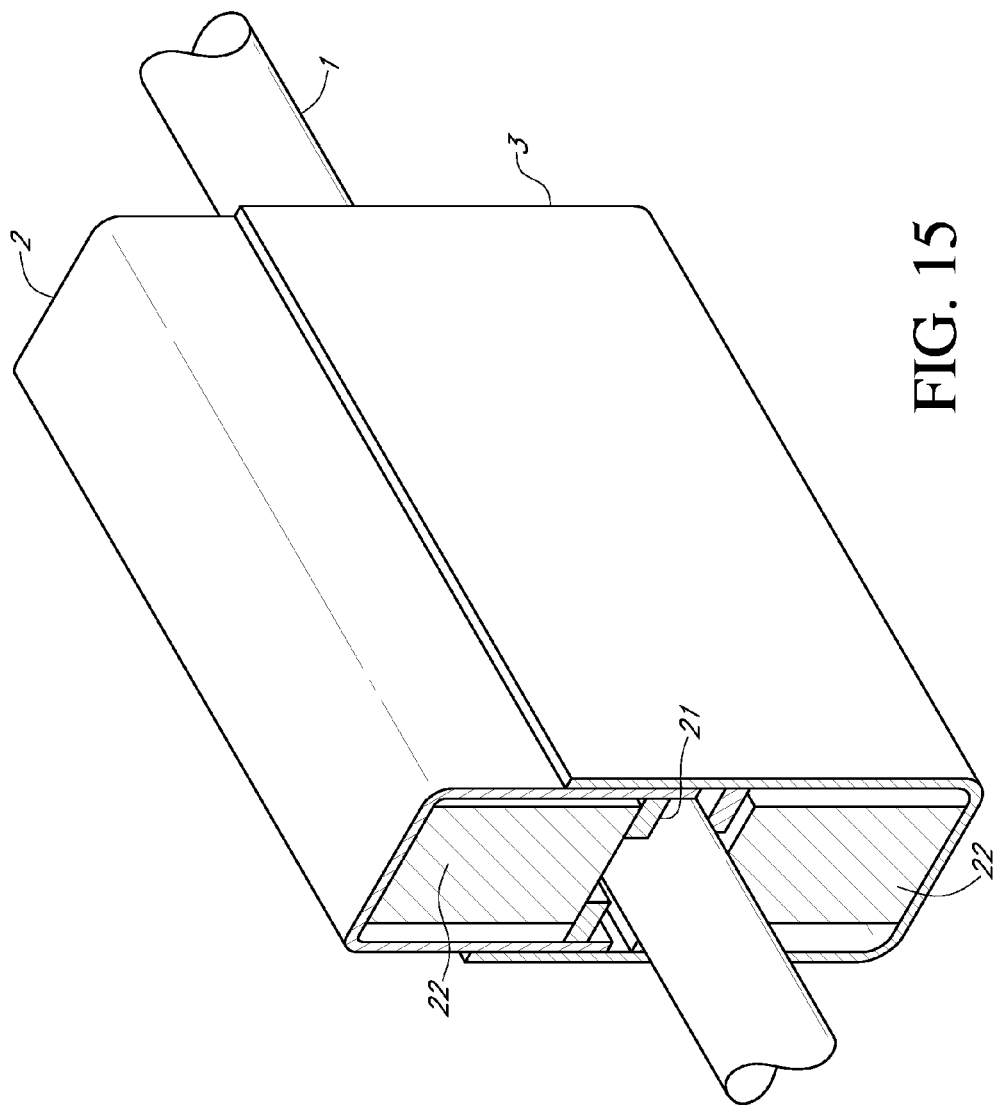
FIG. 15 is a perspective rendering that shows the fluid conditioning unit installed on a fluid carrying pipe, featuring spacer-enclosures and parallel Retaining Bars.

An additional embodiment is shown in FIG. 13 (end view), FIG. 14 (side view) and FIG. 15 (perspective). In FIG. 13 the end view illustrates a unit utilizing two juxtaposed Magnet Module Assemblies (each a two-piece assembly comprising Magnet Module main enclosure 22 and Magnet Module cap 23 and optional flux diverter plate 18) and featuring four parallel Retaining Bars 21. In FIG. 14 and FIG. 15 a one-piece Magnet Module Assembly featuring only a Magnet Module main enclosure 22 are shown. In all three illustrations (FIG. 13, FIG. 14 and FIG. 15), the Retaining Bars 21 function both as a limit stop for the slide-fit between Unit halves 2 and 3 and as retainers to hold Magnet Module Assemblies 22, 23 securely within each Unit half.

The embodiments of the invention in which an exclusive property or privilege is claimed are defined as follows:

1. An apparatus for magnetically treating fluid flowing through a conduit, comprising:
   a conduit having an axis and an exterior surface;
   a fluid flowing through the conduit;
   two unit halves, wherein each of the unit halves has a U-shaped channel having two wall sections and a base section, such that the wall sections form a right angle to the base section;
   wherein the base section of each of the unit halves has a different base width, such that the two wall sections of the first unit half are operable to slide vertically between the two wall sections of the second unit half, leaving an air gap of not more than 2 mm between the wall sections of the unit halves;
   wherein the base section of each of the unit halves has an interior surface;
   wherein a spacer made of non-magnetic material is attached to the interior surface of the base section of each of the unit halves;

wherein each of the spacers is further attached to a magnetically permeable bar, such that the spacer is interposed between the magnetically permeable bar and the interior surface of the base section of each of the unit halves;

wherein each of the spacers is made of a non-magnetic material selected from the group consisting of silver, copper, gold, aluminum and zinc;

wherein each of the unit halves has three or more magnets attached to the magnetically permeable bar, such that the magnetically permeable bar is interposed between the three or more magnets and the spacer;

wherein the two unit halves assemble around the conduit such that the axis of the conduit is parallel to the interior surface of the base section of each of the unit halves and is parallel to the interior surface of the two wall sections of each of the unit halves;

wherein each of the three or more magnets attached to each of the unit halves has a magnetic pole orientation, a north pole, and a south pole;

wherein each of the three or more magnets attached to each of the unit halves has either a north pole or a south pole facing the exterior surface of the conduit;

wherein each of the three or more magnets attached to each of the unit halves is positioned in a magnet pair, being directly opposite the conduit from one of the three or more magnets attached to the other unit half; and wherein the magnetic pole orientation of each magnet pair is oriented such that the magnetic pair has one north pole and one south pole facing the exterior surface of the conduit.

2. An apparatus as in claim 1, wherein the fluid flowing through said conduit is a hydrocarbon based fuel.

3. An apparatus as in claim 2 wherein the hydrocarbon based fuel is gasoline.

4. An apparatus as in claim 2 wherein the hydrocarbon based fuel is diesel fuel.

5. An apparatus as in claim 2 wherein the conduit is a component of an internal combustion engine.

6. An apparatus as in claim 2 wherein the conduit is a component of a heating system.

7. An apparatus for magnetically treating fluid flowing through a conduit, comprising:
- a conduit having an axis and an exterior surface;
- a fluid flowing through the conduit;
- two unit halves, wherein each of the unit halves has a U-shaped channel having two wall sections and a base section, such that the wall sections form a right angle to the base section;
- wherein the base section of each of the unit halves has a different base width, such that the two wall sections of the first unit half are operable to slide vertically between the two wall sections of the second unit half, leaving an air gap of not more than 2 mm between the wall sections of the unit halves;
- wherein the base section of each of the unit halves has an interior surface;
- wherein a spacer made of non-magnetic material is attached to the interior surface of the base section of each of the unit halves;
- wherein each of the spacers is further attached to a magnetically permeable bar, such that the spacer is interposed between the magnetically permeable bar and the interior surface of the base section of each of the unit halves;
- wherein each of the unit halves has three or more magnets attached to the magnetically permeable bar, such that the magnetically permeable bar is interposed between the three or more magnets and the spacer;
- wherein the two unit halves assemble around the conduit such that the axis of the conduit is parallel to the interior surface of the base section of each of the unit halves and is parallel to the interior surface of the two wall sections of each of the unit halves;
- wherein each of the three or more magnets attached to each of the unit halves has a magnetic pole orientation, a north pole, and a south pole;
- wherein each of the three or more magnets attached to each of the unit halves has either a north pole or a south pole facing the exterior surface of the conduit;
- wherein each of the three or more magnets attached to each of the unit halves is positioned in a magnet pair, being directly opposite the conduit from one of the three or more magnets attached to the other unit half;
- wherein the magnetic pole orientation of each magnet pair is oriented such that the magnetic pair has one north pole and one south pole facing the exterior surface of the conduit; and
- wherein each of the spacers completely surrounds the magnets and magnetically permeable bar attached thereto, forming an enclosure.

8. An apparatus as in claim 7, wherein each of the enclosures completely seals off the magnets within from exposure to the exterior operating environment.

9. An apparatus as in claim 8, wherein each of the enclosures is made of a non-magnetic material selected from the group consisting of silver, copper, gold, aluminum and zinc.

10. An apparatus as in claim 8, wherein each of the enclosures is made of plastic.

11. An apparatus as in claim 8, wherein each enclosure is retained within its unit half by a pair of parallel retaining bars running the length of the two wall sections.

12. An apparatus as in claim 11, wherein the pair of parallel retaining bars form a stop-limit to the assembly of the unit halves.

13. An apparatus as in claim 7, wherein the fluid flowing through said conduit is a hydrocarbon based fuel.

14. An apparatus as in claim 13 wherein the hydrocarbon based fuel is gasoline.

15. An apparatus as in claim 13 wherein the hydrocarbon based fuel is diesel fuel.

16. An apparatus as in claim 13 wherein the conduit is a component of an internal combustion engine.

17. An apparatus as in claim 13 wherein the conduit is a component of a heating system.

* * * * *